United States Patent
Kloster

(10) Patent No.: US 9,109,358 B2
(45) Date of Patent: Aug. 18, 2015

(54) MOUNTING DEVICE, A KIT INCLUDING THE MOUNTING DEVICE AND A COVERING ELEMENT, AND A METHOD OF USING THE KIT

(75) Inventor: Hans Brusgård Kloster, Thisted (DK)

(73) Assignee: IDEBANK THY HOLDING APS, Thisted (DK)

( * ) Notice: Subject to any disclaimer, the term of this patent is extended or adjusted under 35 U.S.C. 154(b) by 0 days.

(21) Appl. No.: 14/118,537

(22) PCT Filed: May 18, 2012

(86) PCT No.: PCT/DK2012/050175
§ 371 (c)(1),
(2), (4) Date: Jan. 31, 2014

(87) PCT Pub. No.: WO2012/155921
PCT Pub. Date: Nov. 22, 2012

(65) Prior Publication Data
US 2014/0130443 A1    May 15, 2014

(30) Foreign Application Priority Data
May 19, 2011  (DK) .......................... PA 2011 00387

(51) Int. Cl.
*E04C 2/38* (2006.01)
*E04B 1/41* (2006.01)
(Continued)

(52) U.S. Cl.
CPC ............... *E04B 1/40* (2013.01); *E04F 13/0835* (2013.01); *E04F 19/02* (2013.01); *E04F 19/0463* (2013.01); *F16B 2/205* (2013.01); *F16B 5/128* (2013.01)

(58) Field of Classification Search
CPC ........ F16B 5/128; F16B 5/0642; F16B 5/126; F16B 2/205; F16B 12/26; F16B 19/10; F16B 21/06; A44B 17/0023; E04B 1/40; E04F 19/02; E04F 19/0463; E04F 13/0835
USPC .......... 52/211, 212, 287.1, 288.1, 361, 716.1, 52/718.05; 24/292, 295, 297
See application file for complete search history.

(56) References Cited

U.S. PATENT DOCUMENTS 1,724,601 A * 8/1929 Kellogg .......................... 428/99
1,760,265 A * 5/1930 Carr ................................ 52/511
(Continued)

FOREIGN PATENT DOCUMENTS

EP   0887488   12/1998
GB   810524    3/1959

*Primary Examiner* — Basil Katcheves
*Assistant Examiner* — Joshua Ihezie
(74) *Attorney, Agent, or Firm* — Knobbe Martens Olson & Bear LLP

(57) ABSTRACT

The invention relates to a mounting device (1) for mounting covering elements (7), such as baseboards, door jamb casings or panels, onto a building surface, said device (1) having a rear side portion (11) configured for being mountable to said building surface, and including a bistable snap catch (2, 3) having a peripheral edge (3'), the bistable snap catch (2, 3) being adapted for assuming a natural first configuration wherein said peripheral edge (3') is closer to said rear side portion (11) and a natural second configuration wherein said peripheral edge (3') is farther away from said rear side portion (11). The invention relates also to a building kit comprising said mounting device (1) and a building surface covering element (7), such as a wooden base-board, door jamb casing or panel, and to a method for mounting this building kit.

12 Claims, 5 Drawing Sheets

(51) Int. Cl.
*E04F 13/08* (2006.01)
*E04F 19/02* (2006.01)
*E04F 19/04* (2006.01)
*F16B 2/20* (2006.01)
*F16B 5/12* (2006.01)

(56) References Cited

U.S. PATENT DOCUMENTS

| | | | | |
|---|---|---|---|---|
| 1,804,831 | A * | 5/1931 | Hardesty | 52/716.7 |
| 1,970,139 | A * | 8/1934 | Hayden | 52/512 |
| 1,988,345 | A * | 1/1935 | Vaughn | 428/616 |
| 2,267,379 | A * | 12/1941 | Tinnerman | 52/718.03 |
| 2,540,790 | A * | 2/1951 | Kost | 24/295 |
| 2,948,937 | A * | 8/1960 | Rapata | 24/297 |
| 3,246,440 | A * | 4/1966 | Meyer | 24/297 |
| 3,378,890 | A * | 4/1968 | Perrochat | 24/297 |
| 3,634,991 | A * | 1/1972 | Barton et al. | 52/716.7 |
| 3,680,272 | A * | 8/1972 | Meyer | 24/295 |
| 3,746,378 | A * | 7/1973 | Meyer | 52/511 |
| 3,903,573 | A * | 9/1975 | Wilson | 411/548 |
| 4,152,034 | A * | 5/1979 | Dunning, III | 312/204 |
| 4,228,629 | A * | 10/1980 | Chalmers et al. | 52/460 |
| 4,288,064 | A * | 9/1981 | Austen | 267/182 |
| 4,296,583 | A * | 10/1981 | Egenlauf | 52/717.01 |
| 4,408,372 | A * | 10/1983 | Kimura et al. | 24/662 |
| 4,493,176 | A * | 1/1985 | Cimochowski | 52/508 |
| 4,651,490 | A * | 3/1987 | Marston | 52/410 |
| 4,775,273 | A * | 10/1988 | Bauer | 411/517 |
| 4,874,276 | A * | 10/1989 | Iguchi | 411/48 |
| 4,881,348 | A * | 11/1989 | Davis | 52/127.7 |
| 4,953,267 | A * | 9/1990 | Marino et al. | 24/682.1 |
| 5,107,641 | A * | 4/1992 | Davis | 52/127.7 |
| 5,202,172 | A * | 4/1993 | Graf | 428/100 |
| 5,467,571 | A * | 11/1995 | Khatibi | 52/718.04 |
| 5,561,961 | A * | 10/1996 | Paul | 52/716.7 |
| RE35,971 | E * | 11/1998 | Kessler | 428/100 |
| 5,870,806 | A * | 2/1999 | Black, Jr. | 24/662 |
| 5,876,084 | A * | 3/1999 | Smith et al. | 296/39.1 |
| 6,173,542 | B1 * | 1/2001 | Wright | 52/211 |
| 6,286,273 | B1 * | 9/2001 | Simonar | 52/716.1 |
| 6,604,331 | B1 * | 8/2003 | Pallas et al. | 52/287.1 |
| 7,179,032 | B2 * | 2/2007 | Guy | 411/34 |
| 7,241,235 | B2 * | 7/2007 | Caruso | 473/478 |
| 7,451,576 | B2 * | 11/2008 | Barone | 52/463 |
| 7,641,250 | B2 * | 1/2010 | Gambatese | 296/1.08 |
| 7,770,352 | B2 * | 8/2010 | Plasek et al. | 52/717.01 |
| 8,136,321 | B1 * | 3/2012 | Bauman | 52/506.08 |
| 2002/0178684 | A1 * | 12/2002 | Barnett | 52/716.1 |

* cited by examiner

MOUNTING DEVICE, A KIT INCLUDING THE MOUNTING DEVICE AND A COVERING ELEMENT, AND A METHOD OF USING THE KIT

CROSS REFERENCE TO RELATED APPLICATIONS

This application is a U.S. National Phase Application of PCT International Application Number PCT/DK2012/050175, filed on May 18, 2012, designating the United States of America and published in the English language, which is an International Application of and claims the benefit of priority to Danish Patent Application No. PA 2011 00387, filed on May 19, 2011. The disclosures of the above-referenced applications are hereby expressly incorporated by reference in their entireties.

FIELD OF THE INVENTION

The present invention relates to a mounting device for mounting covering elements, such as baseboards, door jamb casings or panels, onto a building surface, a building kit comprising such a building surface covering element and the mounting device, and a method for mounting the surface covering element onto the building surface using the kit.

BACKGROUND OF THE INVENTION

Conventionally, baseboards and door jamb casings are mounted to wall surfaces using screws passed through holes drilled in the baseboard/casing. Such solutions are disadvantageous in being time consuming and labour intensive and also in that damage to baseboard paint finish may occur. Other solutions are disclosed in U.S. Pat. No. 2,540,790 and GB 810524. However, the latter fasteners do not ensure a reliable fastening over time.

OBJECT OF THE INVENTION

Hence, an improved mounting device would be advantageous, and in particular a more efficient and reliable kit with wooden covering elements would be advantageous.

SUMMARY OF THE INVENTION

Thus, the above described object and several other objects are intended to be obtained in a first aspect of the invention by providing a mounting device for mounting covering elements, such as baseboards, door jamb casings or panels, onto a building surface, the device having a rear side portion configured for being mountable to said building surface, and including a bistable snap catch having a peripheral edge, the bistable snap catch being adapted for assuming a natural, neutral or normal first configuration wherein the peripheral edge is closer to the rear side portion and a natural, neutral or normal second configuration wherein the peripheral edge is farther away from the rear side portion. The bistable nature provides for a highly reliable fastening in that the entire device is active in securing the covering element, in contrast to the prior art solutions disclosed in e.g. U.S. Pat. No. 2,540,790 wherein only local parts of the fastener are active in resisting removal of the covering element.

Preferably, the bistable snap catch includes an invertible part which essentially assumes the shape of a truncated circular cone in the second configuration, the angle $\alpha$ between a generatrix G and the central axis A thereof being in the range of 30°-60°. The bistable snap catch may include a base part extending from the rear side portion and an invertible part essentially assuming the shape of the truncated right circular cone and being defined by a first wall, with the invertible part extending in the second configuration away from the base part; a transition T of the base part to said first wall defines in this case a hinge connection of the bistable snap catch.

The invention also provides a kit that in addition to a bistable snap catch has a covering element with a recess with projecting portions defining an entry dimension of the recess; this entry dimension is selected to allow insertion of the bistable snap catch into the recess when in the second configuration and a withholding of the snap catch by said edge thereof engaging the projecting portions when assuming a catching configuration. Preferably, an invertible part essentially assuming the shape of an truncated right circular cone and being defined by a peripheral wall has reinforcing ribs that extend between a base part and an edge of the wall, with stretchable wall portions between the reinforcing ribs. The ribs provide a large resistance against any unintended local deformation of the peripheral wall part that engages the projecting portions.

The invention also provides a method for mounting a surface covering element, such as a baseboard, door jamb casing or panel, onto a building surface using the aforementioned kit, comprising the steps of 1) mounting the mounting device onto a building surface with the bistable snap catch in a second configuration, 2) placing the covering element with a rear side recess facing the mounting device, 3) arranging then covering element to receive a portion of the bistable snap catch in the recess, 4) applying a force against the covering element to force the bistable snap catch towards a first configuration, and 5) releasing the force upon at least a part of the bistable snap catch assuming a configuration corresponding to the first configuration with a part engaging projecting portions of the recess.

The aforementioned and other aspects of the invention will be apparent from and elucidated with reference to the embodiments described hereinafter.

BRIEF DESCRIPTION OF THE FIGURES

The device, kit and method according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
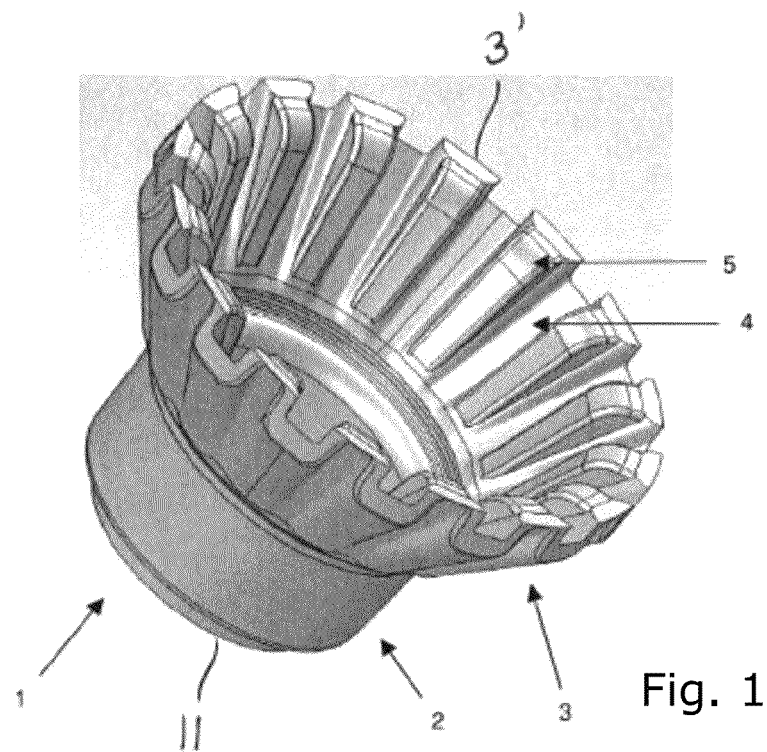
FIG. 1 is a perspective view of the mounting device.

FIG. 1 is a perspective view of the mounting device 1 for mounting covering elements, such as baseboards, door jamb casings or panels, onto a building surface.

The device 1 has a rear side portion 11 configured for being mounted to and against the building surface, and a bistable snap catch that includes a cylindrical base part 2 and an invertible essentially frusto-conical structure defined by a peripheral first wall 3 extending, in a neutral second configuration as shown in FIG. 1, outwards from the base part 2. The transition T (see also FIG. 4) between the base part 2 and the first wall 3 defines an integral hinge connection whereby the first wall 3 may be inverted, i.e. be turned inside out, from the shown second configuration to assume another, neutral first configuration to be discussed further below and wherein the peripheral edge 3' of the wall 3 is closer to the base part 2. In the shown second configuration is the peripheral edge 3' of the first wall 3 farthest away from the rear side portion 11.

The first wall 3 and the peripheral edge 3' may as shown have a jig-saw shape, or may by way of example be defined by a continuous flat surface. In the preferred embodiment is the device 1 made of a plastics material by injection moulding; the wall 3, or segments/portions 4 of the wall 3, is configured to be readily stretchable in the peripheral direction to allow for a temporary increase of the diameter of the frusto-conical structure on use of the device 1 at the time where the wall 3 is inverted, i.e. when the bistable snap catch is brought from the shown second configuration to the first configuration where the peripheral edge 3' runs closer to the rear side portion 11.

Figure 2:
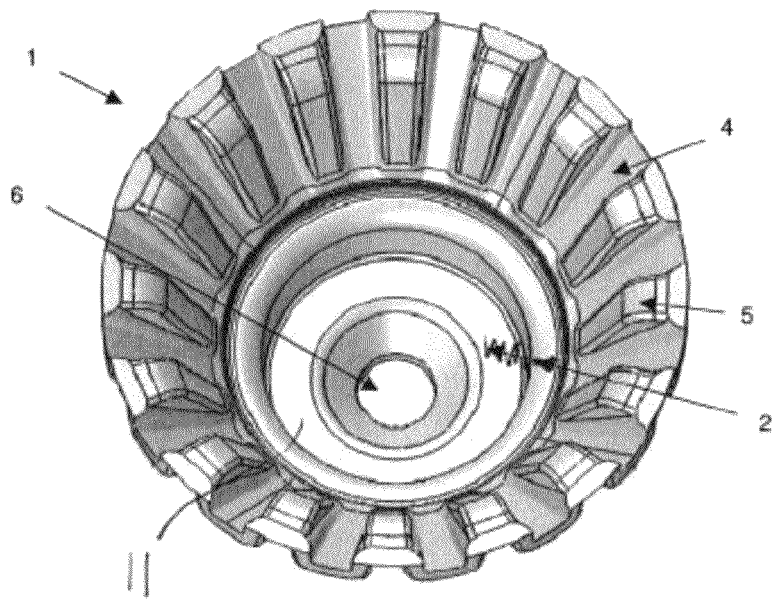
FIG. 2 is a top perspective view of the mounting device of FIG. 1.

FIG. 2 is a top perspective view of the device 1 showing the rear side portion 11 which is integrally connected to the base part 2. The rear side portion 11 may in this embodiment define a flat surface (not visible in FIG. 2) to be placed against the building surface, e.g. a building wall, and a central through-going aperture 6 allows for the device 1 to be fixed to the building wall using a screw. FIG. 2 shows the inner face of the first wall 3 in the second configuration of the bistable snap catch; upon inversion this inner face will define an outer face of a frusto-conical structure.

The covering element may by way of example be a baseboard or skirting, i.e. a wooden or moulded board to be mounted to the lowest part of an interior building wall to cover the joint between the building wall surface and the floor to cover the uneven edge of flooring next to the wall. A baseboard differs from a wainscot-panel which typically covers from the floor to around 1-1.5 m high, whereas a baseboard is typically only 0.2 m high.

Figure 3:
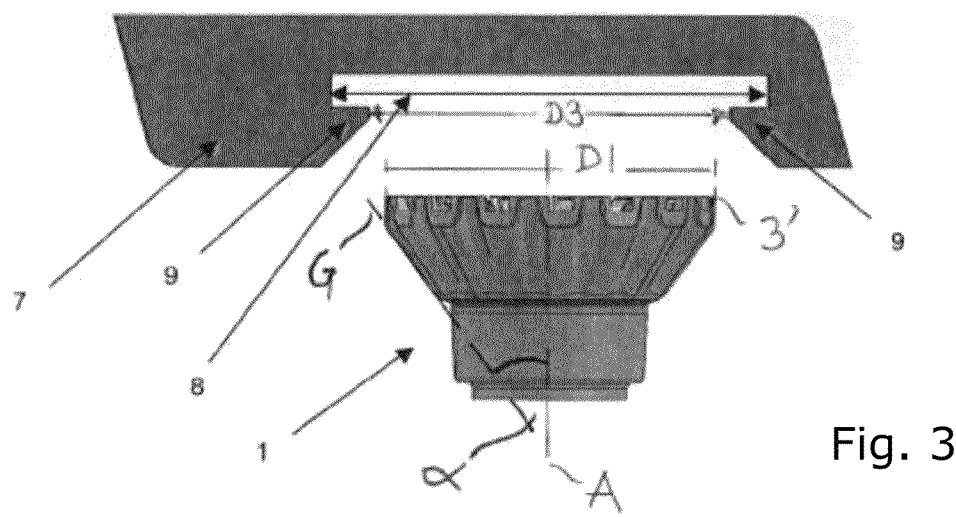
FIG. 3 is a side view showing the mounting device of FIG. 1 with an exemplary building covering element.

FIG. 3 is a side view of the device 1, still in the second configuration, illustrating the frusto-conical structure defined by the wall 3 which extends around central axis A. While the first wall 3 has an uneven surface it will be understood that the outer contour of the wall 3 follows the general shape of a frustum of a cone defined by a plurality of generatrix-lines G cutting central axis A at the apex of an imaginary cone. It is preferred that this invertible wall 3 has angle α between a generatrix G and the central axis A in the range of 30°-60° to provide for a highly efficient snap catch which provides for a reliable securing of covering elements and which at the same time may be inverted by applying a manual force, as explained in the following.

Figure 4:
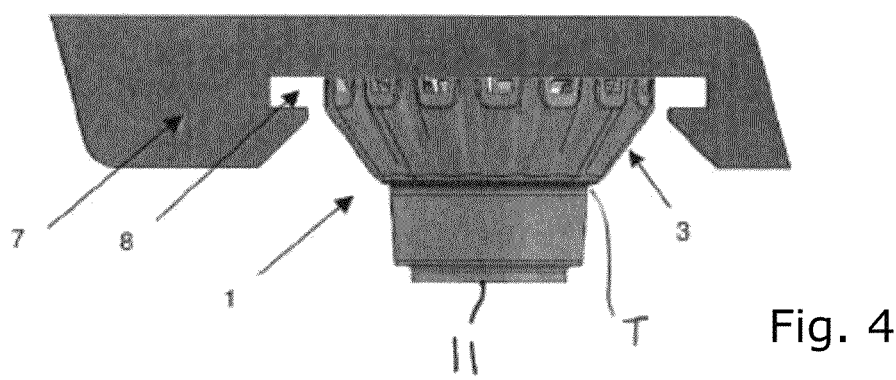
FIG. 4 is a view similar to FIG. 3 wherein the mounting device has been inserted into a recess of the covering element.

FIG. 3 also shows an exemplary building covering element 7, to be mounted onto the building surface and in the form of a baseboard/molding strip 7 having a front side and a rear side with an elongated track-shaped recess 8. The baseboard may be a wooden baseboard with the recess milled into the rear side. The baseboard has an edge shown to the right in FIG. 3; this edge is configured to point upwards when the baseboard is mounted against a building wall; the opposite edge facing left in FIG. 3 is placed against the building floor, and the rear side with the recess is against the building wall (not shown). Prior to the mounting of the baseboard 7 is a row of the mounting devices 1 in the second configuration fixed to the building surface, which in this case would be a building wall, at a height of e.g. 10 cm above the floor. As explained above, fixing may take place using a screw which is screwed into the building wall through the aperture 6 shown in FIG. 2. The recess 8 has projecting portions 9 defining an entry dimension D3 of the recess 8, the entry dimension D3 being selected to allow insertion of the bistable snap catch into the recess 8 when in the second configuration, as shown in FIG. 4 where the baseboard 7 has been moved manually by the builder towards the device 1 until the bottom of the recess 8 bears against the edge 3' of the wall 3 of the mounting device 1.

Figure 5:
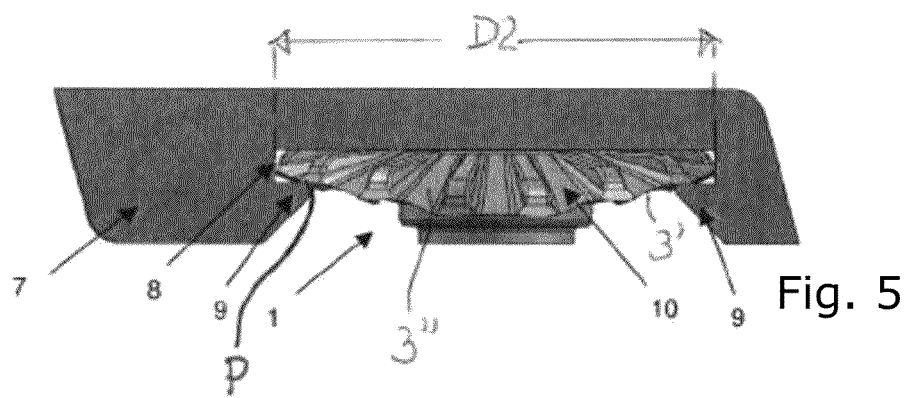
FIG. 5 is a view similar to FIG. 3, after mounting of the covering element.

FIG. 5 shows a next step during the mounting of the baseboard 7 where the baseboard 7 has been manually pressed further against the edge 3' of device 1, giving rise to a deformation of the device 1 to a catching configuration where a major segment 3" of the wall 3 is inverted to a larger degree than a remaining peripheral segment or part P of the wall 3. The shown configuration of the segment 3" may correspond essentially to the overall shape that the wall 3 of the mounting device 1 would assume along its entire periphery had a rearward movement of the wall 3 not been restricted by the projecting portions 9.

The recess 8 is preferably configured and dimensioned such that cross-over of the mounting device 1 from the second bistable configuration towards the first bistable configuration has taken place when the rear surface of surface covering, e.g. the baseboard 7, rests against the building surface/wall, i.e. as shown in FIG. 5. More particularly, in this embodiment a dimension D2 of the bistable snap catch perpendicular to the aforementioned axis A and corresponding to cross-over between the natural first configuration and the natural second configuration is equal to or less than the width of the recess 8 but greater than the recess entry dimension/width D3. By 'cross-over' is generally meant herein the point of transition in shape by deformation wherein the inherent stresses in the device 1 are such that it will no longer naturally assume the second configuration but rather seek towards the first configuration, i.e. the point where the peripheral tension is at maximum; when cross-over takes place a pronounced snap effect occurs which gives rise to an effective and sudden catching or engagement of the projections 9. As shown in FIG. 5, in this catching configuration the part P of the edge 3' engages or catches the projecting portions 9 while the segment 3" has moved relatively more towards the second configuration wherein the frusto-conical invertible wall 3 is fully inverted. In this configuration, withholding of the covering element 7 takes place by the edge 3' along part P engaging the projecting portions 9 and applying a force against the projections 9 through the inherent stresses in the wall 3, arising from its tendency to move fully towards the first, inverted configuration. Preferably, 20-40% of the perimeter of the frusto-conical wall 3 extends behind the projections 9. The peripheral edge 3' may touch the base part 2 in the first configuration in which case the wall 3 may be under some peripheral tension.

It is preferred that the recess 8 is dimensioned such that the wall 3 is inverted along the entire periphery of the wall edge 3' when received by the covering element 7, to provide the greatest catching force. However, in the catching configuration it may in less preferred embodiments be desirable that only the segment 3" is allowed to assume a beyond cross-over configuration whereby this segment 3" alone will give rise to stresses in the part P that apply the necessary force against the projections 9 for resisting removal of the covering element 7. This will to a large degree depend on the design of the recess 8, including the depth of the recess 8 measured as the gap between the bottom of the recess 8 and the projecting portions 9.

To remove the covering element 7 the builder may apply a withdrawing force along the general direction defined by axis A. This force will first seek to move the part P towards the first configuration, and the inherent stresses in the wall 3 will give rise to a deformation back to the original natural second configuration of the mounting device, allowing reuse of the mounting device 1 for remounting a covering element 7.

Preferably, as shown in FIG. 1, the wall 3 has reinforcing ribs 5 that extend between the base part 2 and the edge 3', with peripherally stretchable wall portions 4 between the reinforcing ribs 5. The ribs 5 provide an increased resistance against any unintended local deformation of the peripheral part P that engages the projecting portions 9 and that might give rise to a release of the covering element 7 without a full return inversion of the entire wall 3 to the second configuration. It is also preferred to provide the mounting device 1 with a degree of symmetry about axis A to allow it to work irrespectively of how the device 1 may have been turned around axis A on fixing it to the building structure.

Figure 6:
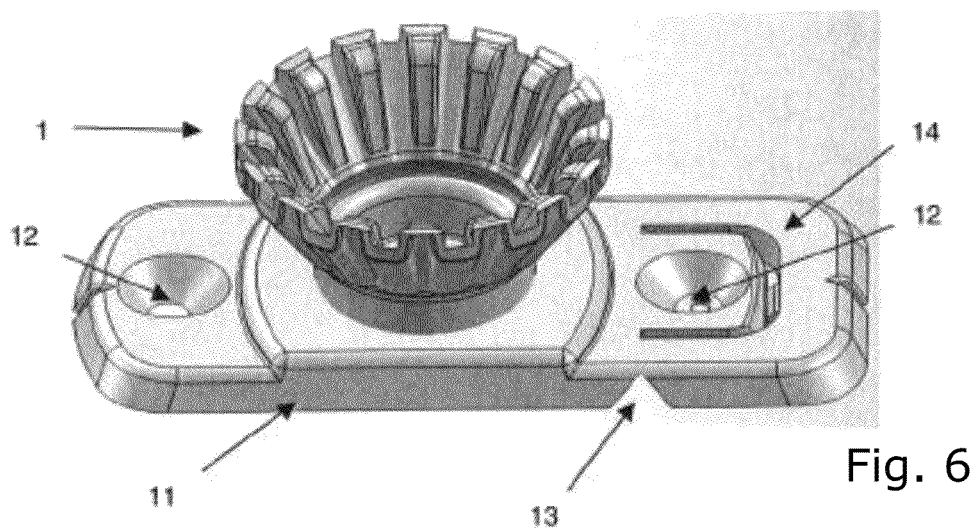
FIGS. 6 and 7 show another embodiment of the mounting device, with a different base portion, shown in two different configurations.

While the recess 8 in the shown embodiment is elongated it may alternatively be circular, with the projections 9 possibly extending only along a part of the peripheral edge 3' thereof. Also, as shown in FIGS. 6 and 7, the rear side portion may extend significantly laterally beyond the snap catch 1, 2 to provide for an increased bearing surface with through apertures 12 for mounting screws.

Figure 7:
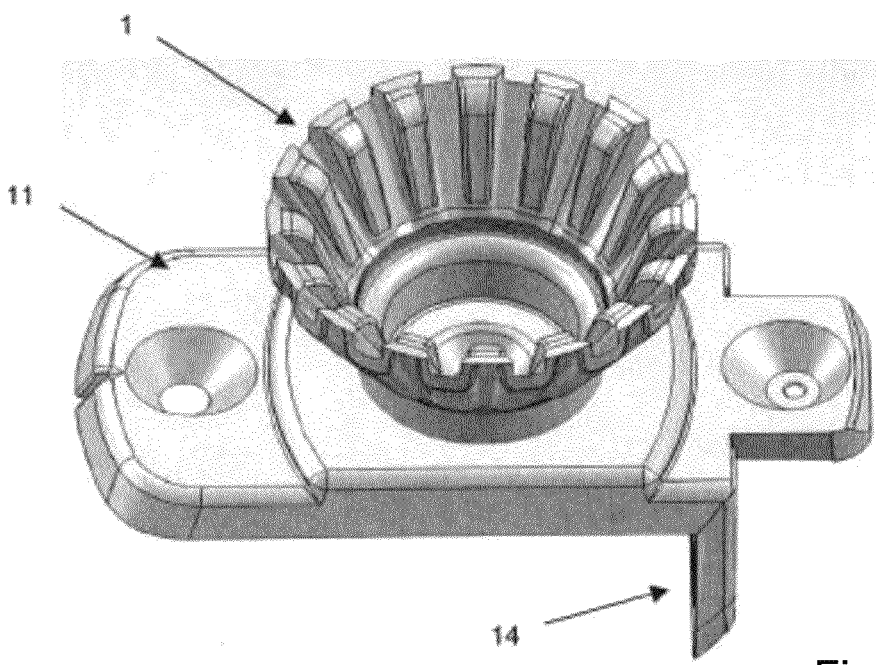

Shown in FIG. 7 is a wing segment 14 of the rear side portion that has been bent to a transverse position. This embodiment is particularly useful when mounting door jamb casings where the mounting device 1 may be aligned properly with the door frame by inserting the wing segment 14 into the narrow gap between the door frame and the building wall aperture, in a position against an edge of the door frame.

Figure 8:
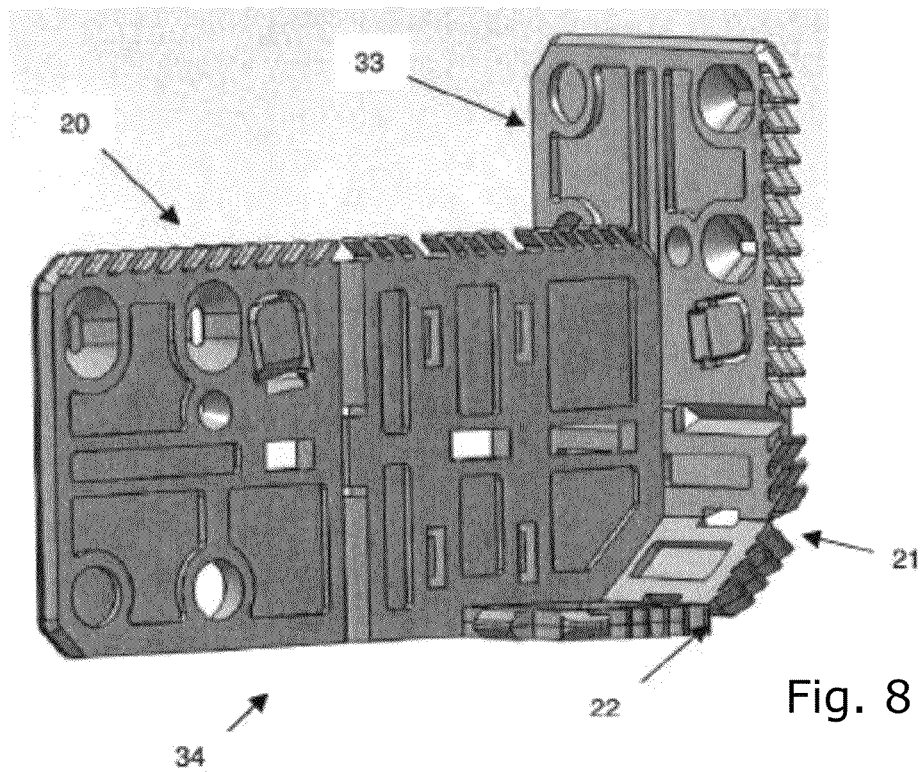
FIGS. 8, 9 and 10 show a connecting piece for connecting covering elements, and configured to be useful also in a marking template, and FIGS. 11 and 12 schematically show alternative embodiments of the mounting device, shown in the second configuration and adapted to be invertible.

To ensure that the mounting devices 1 are mounted to the building surface in a position correctly aligned with the recess 8 of the surface covering 7, such as in particular a wooden baseboard/molding, a template may be used; the template may be as shown in FIG. 8 where a first part 20 is snapped into engagement with a second part 33 which has a foot 22. The first part 20 forms a hand piece that the builder may use to slide the template against the building surface with the foot 22 against the floor and the second part 33 against the wall. Holes in the second part receive a marking device, such as a pen, thus marking in this process a line along the building wall as the template is moved. By placing the holes at a position corresponding to the aperture 6, 12 in the device 1 and, hence, to the known position of the recess 8, an easy installment of the mounting device 1 is achieved.

Figure 9:
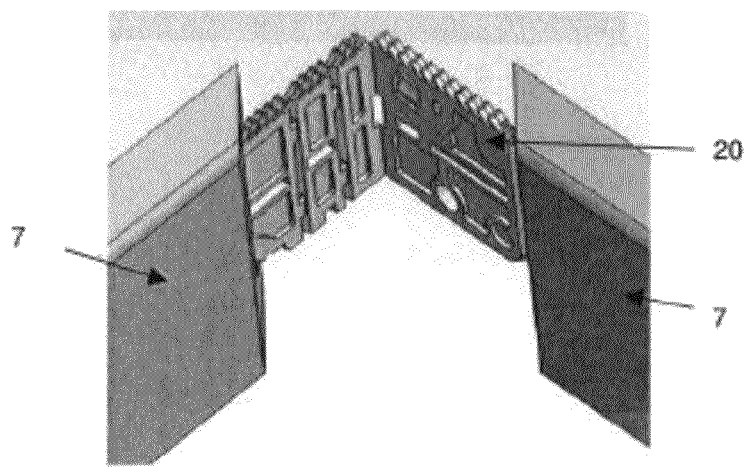
Figure 10:
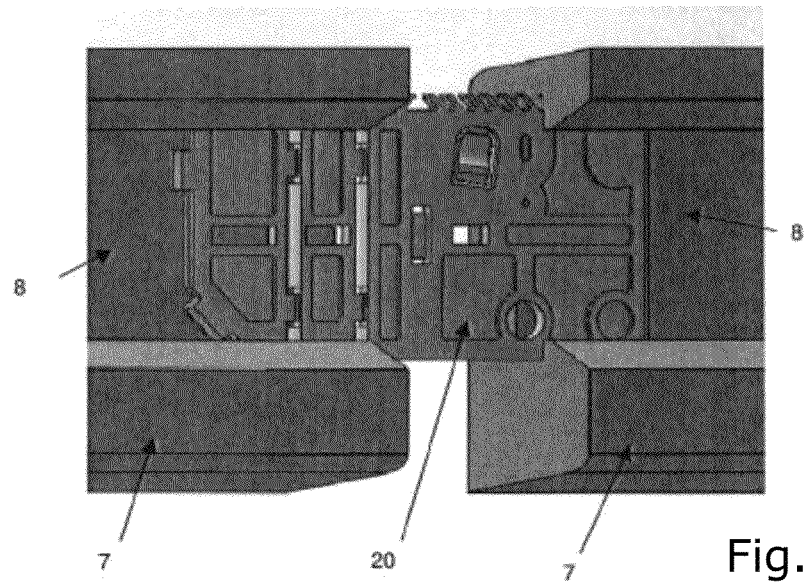

The first part 20 mentioned above with reference to FIG. 8 is shown in another configuration in FIG. 9, bent along a line of weakness and used to joining two baseboards 7 that run perpendicularly to each other at a building corner. As shown in FIG. 10 this part 20 may also be used for joining two baseboards 7 running in extension of each other. A flexible toothing along edges of the part 20 serves to perfectly anchor the part 20 in the recess 8.

Figure 11:
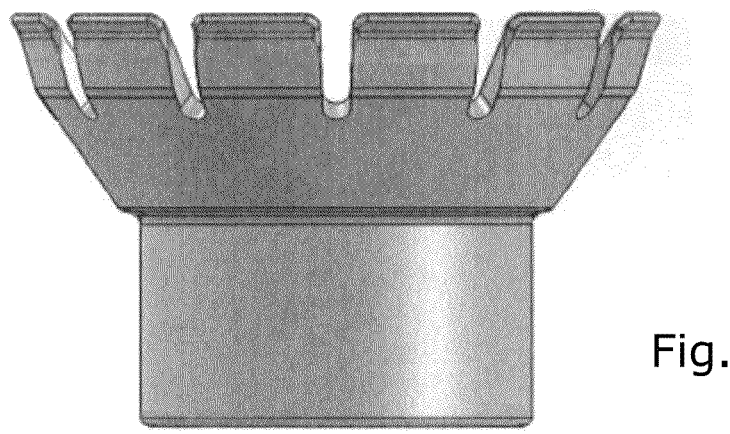
Figure 12:
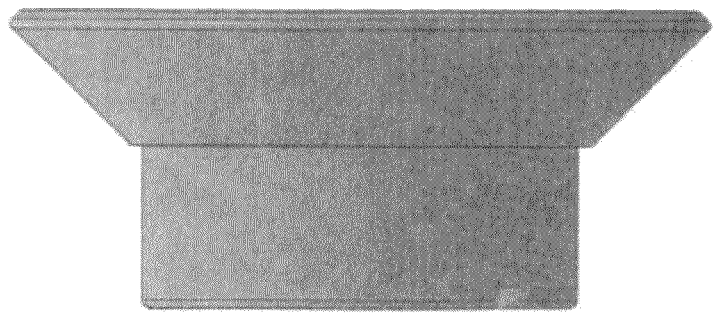

FIGS. 11 and 12 show two alternative embodiments of the bistable snap catch, one in FIG. 12 having the first wall 3 defined by a continuous flat surface of a frusto-conical wall of uniform thickness adapted to be inverted, i.e. turned inside out, for assuming a first configuration. In the latter embodiment the peripheral edge 3' runs continuously in one plane in contrast to the edge 3' shown in FIG. 11 where short slits run towards the rear portion 11, halfway along the invertible wall 3.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A mounting device for mounting covering elements onto a building surface, wherein said mounting device comprises a rear side portion configured for being mountable to said building surface, a bistable snap catch comprising an invertible part having a peripheral edge, and a hinge connection between said rear side portion and said invertible part, wherein said invertible part is invertible about said hinge connection, the bistable snap catch being adapted for assuming a natural first configuration, wherein said invertible part is inverted about said hinge connection and said peripheral edge is closer to said rear side portion, a natural second configuration, wherein said invertible part has the shape of a truncated circular cone and said peripheral edge is farther away from said rear side portion, and a catching configuration, wherein said invertible part is in a position between those of said natural first configuration and said natural second configuration and wherein said peripheral edge is adapted for engagement with a recess in a covering element,
    wherein said bistable snap catch comprises a central axis and a dimension of said bistable snap catch being perpendicular to said central axis, wherein said dimension is relatively larger when assuming a configuration at a cross-over between said natural first configuration and said natural second configuration, and
    wherein said bistable snap catch comprises a rigid base part that extends from said rear side portion, wherein said invertible part is defined by a first wall, wherein said invertible part extends in said natural second configuration away from said rigid base part, and wherein the transition of said rigid base part to said first wall defines said hinge connection of said bistable snap catch.

2. The mounting device of claim 1, wherein said rear side portion is configured for receiving a mounting means, a screw or a nail, which mounts the device onto said building surface, or, wherein said rear side portion comprises apertures for receiving a mounting means, a screw or a nail, which mounts the device onto said building surface.

3. The mounting device according to claim 1, wherein the angle α between a generatrix and the central axis thereof is in the range of 30°-60°.

4. The mounting device according to claim 1, further comprising reinforcing ribs that extend between said rear side portion and said edge, with stretchable material portions between said reinforcing ribs.

5. The mounting device according to claim 1, wherein said bistable snap catch is a resiliently deformable plastic material.

6. A building kit comprising a building surface covering element and a mounting device for mounting the covering element onto a building surface, wherein:

said mounting device comprises a rear side portion configured for being mountable to said building surface, a bistable snap catch comprising an invertible part, and a hinge connection between said rear side portion and said invertible part, wherein said invertible part is invertible about said hinge connection, the bistable snap catch being adapted for assuming a natural first configuration, wherein an edge of said invertible part of said bistable snap catch is closer to said rear side portion and a natural second configuration, wherein said edge is farther away from said rear side portion, wherein a dimension of said bistable snap catch, or a dimension perpendicular to a central axis of the bistable snap catch, is relatively larger when said bistable snap catch assumes a catching configuration at or near cross-over between said natural first configuration and said natural second configuration, said covering element comprises a recess with projecting portions defining an entry dimension of said recess, said entry dimension being selected to allow insertion of said bistable snap catch into said recess when in said second configuration and a withholding of said bistable snap catch by said edge engaging said projecting portions when assuming said catching configuration, and said bistable snap catch further comprises a rigid base part that extends from said rear side portion, wherein said invertible part has the shape of a truncated right circular cone and is defined by a first wall, wherein said invertible part extends in said natural second configuration away from said rigid base part, and wherein the transition of said rigid base part to said first wall defines said hinge connection of said bistable snap catch.

7. The building kit according to claim 6, wherein a part of said bistable snap catch is in a configuration corresponding to said natural first configuration when a part of said edge engages said projecting portions.

8. The building kit according to claim 6, wherein said recess is an elongated track formed in a rear side of said covering element, and said projecting portions are located opposite each other.

9. The building kit according to claim 6, wherein said rear side portion is configured for receiving screws or nails for mounting the device onto said building surface, or said rear side portion comprises apertures for receiving screws or nails for mounting the device onto said building surface.

10. The building kit according to claim 6, wherein the angle α between a generatrix and the central axis thereof is in the range of 30°-60°.

11. The building kit according to claim 6, wherein said first wall has reinforcing ribs that extend between said rigid base part and said edge, and wherein said first wall has stretchable wall portions between said reinforcing ribs.

12. A method for mounting a surface covering element onto a building surface comprising:

providing the building kit of claim 6;

mounting said mounting device onto the building surface with said bistable snap catch in said natural second configuration;

placing said covering element with said recess facing said mounting device;

arranging said covering element to receive a portion of said bistable snap catch in said recess;

applying a force against said covering element to force said bistable snap catch towards said natural first configuration; and releasing said force upon at least a part of said bistable snap catch assuming a configuration corresponding to said natural first configuration with a part of said edge engaging said projecting portions of said recess.

\* \* \* \* \*